March 11, 1952 W. A. R. MALM 2,588,740

KINETO-OPTICAL SCANNING WITH MODULATED LIGHT BEAM IN TELEVISION IMAGE PROJECTION

Filed April 15, 1944

William A. R. Malm
INVENTOR.

Patented Mar. 11, 1952

2,588,740

UNITED STATES PATENT OFFICE 2,588,740

KINETO-OPTICAL SCANNING WITH MODULATED LIGHT BEAM IN TELEVISION IMAGE PROJECTION

William A. R. Malm, New Orleans, La.

Application April 15, 1944, Serial No. 531,205

4 Claims. (Cl. 178—7.6)

Figures 1, 2:
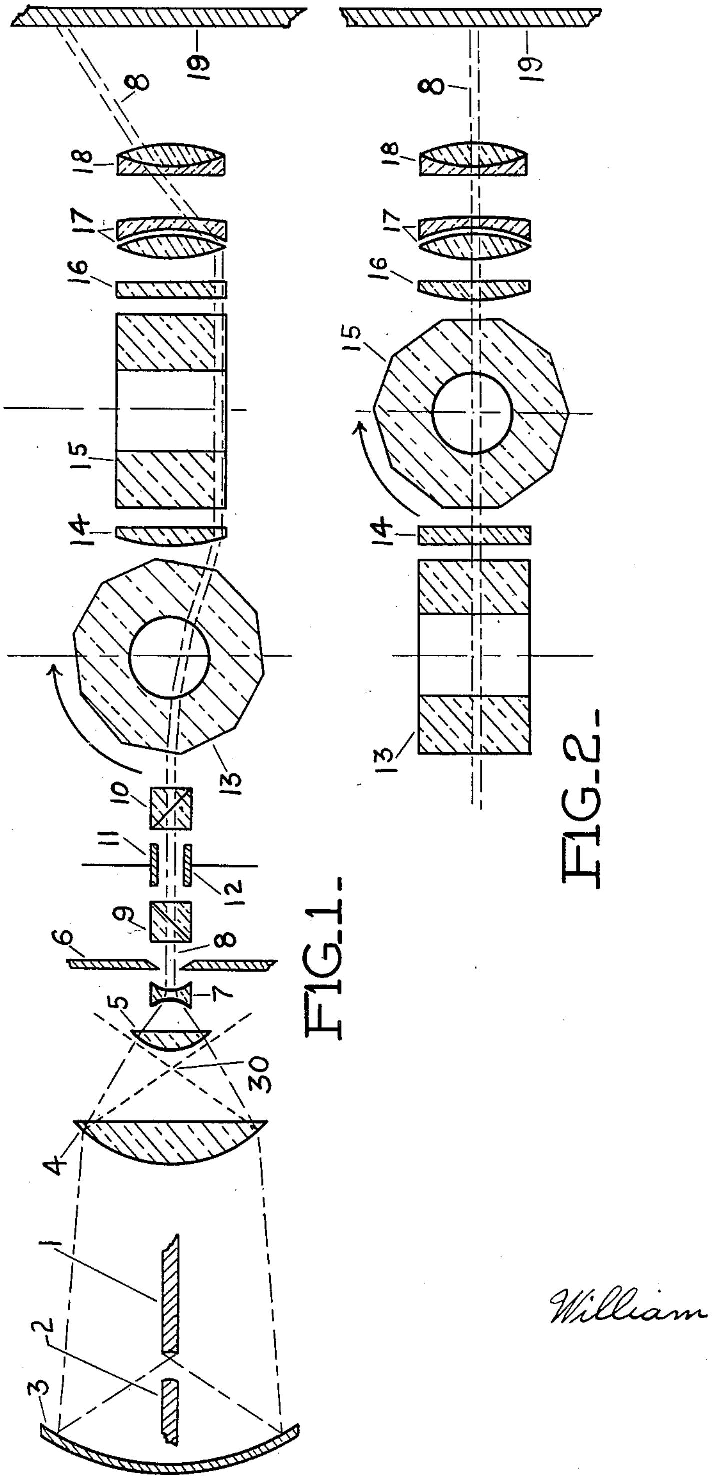

This invention relates to methods and means for producing and controlling the synchronized scanning light beam in the receiver of a television system and the like, in such a manner as to produce a sufficiently brilliant television image upon a large screen.

Object scanning at the transmitter and image scanning at the receiver have both been accomplished by electronic and mechanical means. The electronic devices were efficient but expensive, while the mechanical devices proposed heretofore were inexpensive but inefficient and some were impractical.

This invention provides means for scanning the television image upon the receiver screen, with a modulated parallel light beam; comprised of kineto-optical devices, light condensing and light beam paralleling lenses, etc., hereinafter described. Suitable means for utilizing any convenient light source of sufficient intensity, are provided. The light beam modulator of the receiver in this invention may be electro-mechanical, electro-magnetic, magneto-optic, or electro-optic, although the specification and drawing refer to the electro-optic type.

Many of the image projection methods for television receiver screens known at present are limited in usefulness, due to low efficiency of the light source, or excessive loss of light by faulty design of scanning devices.

In television image projection devices proposed heretofore, life size image reproduction was extremely difficult to attain because the optical system, the light modulator, or the scanner utilized only a small portion of the light beam to form the image scanning spot upon the screen. The constructional requirements of many scanners were extended beyond practical mechanical limits, in order to provide means for producing acceptable image detail.

The projection of greatly enlarged television images makes unusual demands upon the illuminating system, as a much greater amount of light is required in order to project an image having a satisfactory and sufficient brightness. The increased amount of light required can be partially obtained by increasing the intensity of the light source, after which, any additional brightness of the projected image must be obtained by increasing the efficiency of the optical system, light modulator, and scanner.

An object of this invention is to provide practical means for collecting all available rays from a source of light, concentrating and propagating these rays through a modulator and scanner to form an image upon a screen, with minimum loss of light.

A further object of this invention is to provide practical means for scanning a screen with an image forming beam of light, consistent with maximum light propagation efficiency.

Other objects of this invention will appear hereinafter.

The views in the drawings are entirely sectional, to facilitate illustration of the optical devices.

Figure 1 is a vertical plane sectional view of the related devices for receiving television images. Figure 2 is a horizontal plane section of the kineto-optical scanning devices and image projecting devices shown in Figure 1. Said kineto-optical devices and the parallel scanning light beam are not proportionately drawn, as it is quite obvious that high quality picture detail can be obtained only when said parallel light beam, which determines the size of the scanning light spot on the screen, has an extremely small cross-sectional area in a plane perpendicular to its plane of transmission.

The television images of objects, which are transmitted by radio or wire, are received upon a viewing screen suitable for a large gathering of observers.

Description of the devices shown in the drawings will disclose their operation.

Radiations from arc lamp at a point between electrodes 1 and 2 are collected and converged by means of reflector 3. Fused quartz lens 4, or lens of any material possessing similar characteristics, has a higher refractive index for heat rays than for light rays, therefore, the converging light rays are concentrated upon condensing lens 5 while the heat rays are brought to a focus at a point 30 between the fused quartz lens 4 and the condensing lens 5 as indicated in the drawing. The dispersion of heat rays in this manner allows the same lens 4, which condenses light rays, to also act as a means for the protection of heat sensitive light modulators or other devices as may be used in the application of this invention. Heat shield 6 provides further protection from heat generated by intense light sources as may be required.

The drawing shows 5 as one lens, but the light rays at this point could be condensed by two or more lenses as may be required, without deviating from the purpose of this invention. The light rays condensed by lens 5 are converted into a parallel beam of light 8 by means of negative lens 7. It is quite obvious that the use of a positive lens system to convert said condensed light rays into a parallel light beam is within the scope of this invention.

Polarizer prism 9, analyzer prism 10, and electrodes 11 and 12, comprise the elements of an electro-optic light modulator suitably applied to this invention, in which the received television signals are impressed upon said electrodes, thereby modulating the light beam 8 as required for the construction of television images upon screen 19.

Prismatic lens 13 is a polyhedron with a concentric circular hole, which rotates in a vertical plane and at a constant speed. Its speed must be consistent with the number of polygonal sides of the polyhedron, image scanning line and frame frequencies, and the practical limits of rotational devices.

Prismatic lens 15 is a polyhedron with a concentric circular hole, which rotates in a horizontal plane and at a constant speed. Its speed must be consistent with the number of polygonal sides of the polyhedron, image scanning line or frame frequencies, and the practical limits of rotational devices.

The speed of rotation of prismatic lenses 13 and 15 increases with the required number of image scanning lines and frames per second, and varies inversely as the number of polygonal sides.

The means for rotating and synchronizing prismatic lenses 13 and 15 are not shown in the drawing, for simplicity, as there are several well known devices suitable for this purpose.

Prismatic lens 13 could function as a line frequency scanner with prismatic lens 15 as a frame frequency scanner, or vice versa. Said prismatic lenses 13 and 15 are shown in the drawing as having ten polygonal sides in order to simplify the illustration of light beam deflection, however, experiments have shown that the optimum number of sides for a line frequency scanner is found somewhere between twenty and thirty. Ten polygonal sides would be suitable for a frame frequency scanner.

The concentric circular hole in prismatic lenses 13 and 15 provides means for increasing the total deflection of light beam 8 by said prismatic lenses, to compensate for reduced refraction in the polyhedron caused by increasing the number of polygonal sides in order to obtain a rotational speed within practical limits and commensurate with present day standards of line and frame frequencies. Experiments have demonstrated that the angle of total deflection of the scanning beam within the polyhedron varies inversely as the diameter of the concentric circular hole.

The concentric circular hole in the prismatic lenses also causes the deflected light beam to emerge in a divergent manner to allow for proper scanning spread in proportion to the width of the scanning light beam, in order that the image scanning lines will not appear too close to each other or too far apart. This is important, particularly in the case of the frame frequency scanner, as its scanning spread must equal the number of lines produced by the line frequency scanner multiplied by the thickness of the scanning beam, since the thickness of the scanning beam determines the width of one scanning line. The composition of the image first occurs between cylindrical lens 16 or 47 and achromatic lens 17 or 48, respectively. A 500 line image would require a frame frequency scanning spread of 5 inches, assuming the thickness of the scanning beam to be in the order of $\frac{1}{100}$ of an inch.

It is essential that the scanning spread be accomplished without creating any excessive divergence within the scanning beam, otherwise an impractically small cross-sectional area of the original parallel scanning light beam would be required to compensate for spread of the scanning beam itself.

As light beam 8 passes through rotating prismatic lens 13, it is vertically deflected and scans a vertical line upon screen 19 each time a polygonal side sweeps through said light beam.

Light beam 8 follows a succession of divergent paths in a vertical plane, as it is deflected by rotating prismatic lens 13. These successively divergent paths are paralleled by means of cylindrical lens 14, so that said light beam 8 may be properly deflected by prismatic lens 15 rotating in a horizontal plane.

Light beam 8 then passes through rotating prismatic lens 15, its horizontal deflection causing the vertical lines scanned upon screen 19 by prismatic lens 13 to appear adjacent to each other in rapid succession, as each polygonal side of prismatic lens 15 sweeps through said light beam.

Light beam 8 follows a succession of divergent paths in successive horizontal planes, as said light beam is vertically deflected by prismatic lens 13 and simultaneously deflected horizontally by prismatic lens 15. These successively divergent paths, in successive horizontal planes, are paralled by means of cylindrical lens 16; thusly forming a television image with the modulations of light beam 8 for projection upon screen 19.

The size of the television images projected upon screen 19 is determined by the effective focus of the lens assembly 17 and 18.

This invention may have other embodiments without departing from its spirit.

What is claimed as new and desired to be secured by Letters Patent, is as follows:

1. In a television image projector and the like, a light source, means for collecting and concentrating light from said source into a parallel beam of extremely small cross-sectional area, a modulating means, and means for forming a television image upon a screen with said light beam, comprising a vertically rotating polyhedronal prismatic lens having a concentric circular hole and functioning with a related horizontal axis cylinder lens, a horizontally rotating polyhedronal prismatic lens also having a concentric circular hole and functioning with a related vertical axis cylinder lens, and an achromatic lens assembly providing means for determining the total screen scanning area or size of the television image projected upon said screen.

2. In a television image projector and the like, an optical reflector for collecting and converging radiations from a source of light, a condensing lens or lenses for further converging or concentrating said radiations, suitable positive or negative lens or lenses providing means for converting the light rays of said convergent radiations into a parallel beam of light of required cross-sectional area and sufficiently extended length, a light modulator interposed between said converting lens or lenses and a kineto-optical light scanner assembly comprised of a plurality of perpendicularly rotated polyhedronal prismatic lenses having a concentric circular hole, and associated aberration corrective lenses, a heat shield providing means for protecting said light modulator from heat rays, and a lens assembly for projecting the television image upon a screen.

3. In a television image projector and the like, a lens system for vertically scanning a television image screen with a parallel beam of light; comprising a vertically rotating polyhedronal prismatic lens having a concentric circular hole, a cylindrical lens for paralleling the vertically divergent paths of said parallel light beam which deflected by said rotating polyhedronal prismatic lens, and an achromatic lens assembly for determining the total screen area covered by scanning light.

4. In a television image projector and the like, a lens system for horizontally scanning a television image screen with a parallel beam of light; comprising a horizontally rotating polyhedronal prismatic lens having a concentric circular hole, a cylindrical lens for paralleling the horizontally divergent paths of said parallel light beam which is deflected by said rotating polyhedronal prismatic lens, and an achromatic lens assembly for determining the total screen area covered by scanning light.

WILLIAM A. R. MALM.

REFERENCES CITED

The following references are of record in the file of this patent:

UNITED STATES PATENTS

| Number | Name | Date |
|---|---|---|
| 2,163,537 | Clothier et al. | June 20, 1939 |
| 2,213,307 | Elliot | Sept. 3, 1940 |
| 2,222,937 | Dimmick | Nov. 26, 1940 |
| 2,288,079 | Fitz | June 30, 1942 |
| 2,349,298 | Okolicsanyi | May 23, 1944 |

OTHER REFERENCES

Wood-Physical Optics, Macmillan 1921, pages 414–415.